July 9, 1935.  F. M. MEIJER  2,007,405
PROCESS FOR MAKING COFFEE FREE FROM CAFFEIN
Filed April 22, 1931
FIG:1
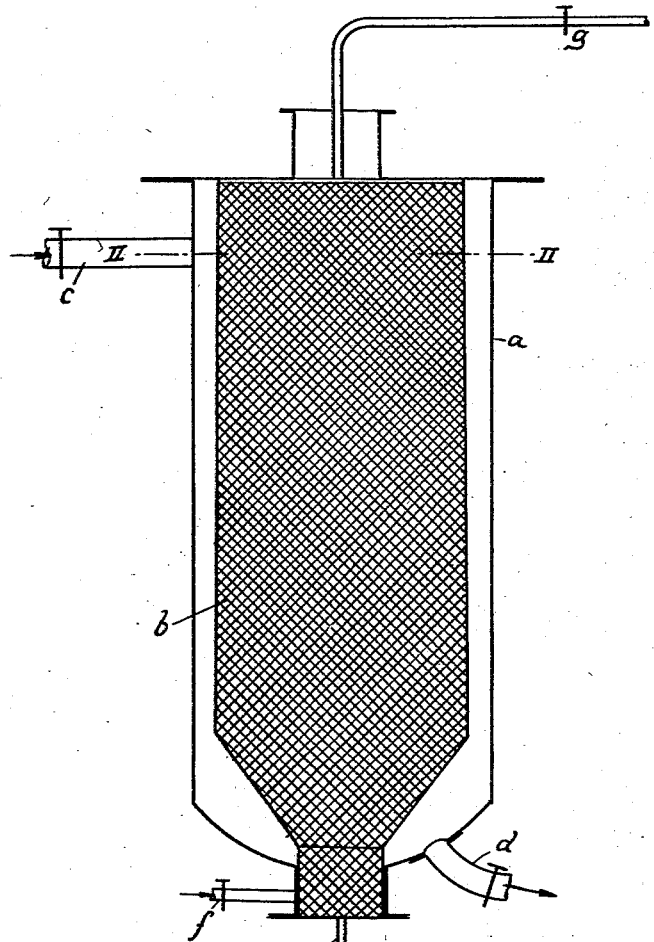
FIG:2
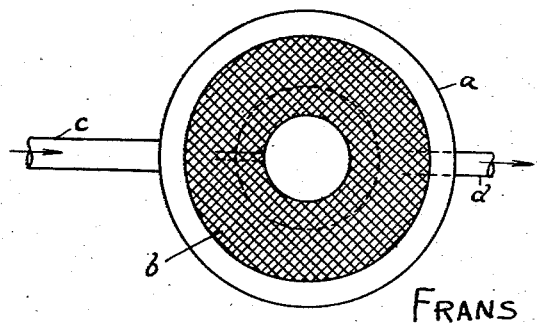
INVENTOR
FRANS M. MEIJER
By Emil Bönnelycke
ATTORNEY Patented July 9, 1935

2,007,405

UNITED STATES PATENT OFFICE 2,007,405

PROCESS FOR MAKING COFFEE FREE FROM CAFFEIN

Frans Marinus Meijer, Amsterdam, Netherlands, assignor to Wilhelmus Henricus Levelt, Amsterdam, Netherlands Application April 22, 1931, Serial No. 532,133
In the Netherlands April 26, 1930

3 Claims. (Cl. 99—11)

Various processes have been described for removing caffein from coffee. Originally the procedure was to open up the bean by means of an alkaline or acid vapour or liquid, such as ammonia, a solution of lime, sodium carbonate or potassium carbonate, acetic acid or sulphurous acid, and then to extract the caffein by means of an organic solvent. The purpose in view can be achieved in this manner but all such processes have the disadvantage that they affect the taste of the extracted coffee.

Later it was proposed to open up the coffee bean by means of steam. This constituted an essential improvement but involved a further objection, for in steaming the coffee beans a considerable quantity of water condenses on and in the beans, so that these are leached and substances which supply the aroma are lost.

In order to overcome this disadvantage it has been proposed to bring the beans to a temperature of 100-120° C. before the opening up, and afterwards in the separation of the extraction agent, whereby condensation of the steam on the beans is avoided.

The present invention relates to a process in which the beans are opened up with steam and then extracted by means of a solvent which is finally removed by means of steam, the characteristic of the process being the means whereby condensation of the steam on the beans is avoided.

According to the invention the beans are treated with steam in a perforated vessel which is surrounded by a wall which forms part of the apparatus wherein the treatment is conducted and is spaced apart from the perforated vessel. Thus the latter is, for example, a jacketed vessel, such that there is a space between the perforated vessel and the jacket, the form of the perforated vessel and the jacket preferably being similar. When the beans are steamed there is at first condensation of water both on the cold beans and on the inner wall of the jacket. As the temperature in the middle soon becomes higher than that of the wall of the jacket, the further condensation of steam occurs chiefly on the jacket, since the latter is cooled by radiation. The condensed steam then flows down the inner surface of the jacket without coming into contact with the beans. In this manner it is easily separated.

After the operation of opening up, the beans are extracted by means of the solvent and then the residual solvent is expelled by means of steam in the manner described above. In this way the beans may be strongly steamed, for example during 8 hours, without any removal of substances by extraction by the effluent water, which remains completely clear.

The process of the invention has the advantage that the coffee need not be preheated and that, if necessary, the whole process, namely the opening up, the extraction and the steaming, may be carried out in the same apparatus. Thus the use of a rotating drum is not necessary.

The invention will be more fully described with reference to the accompanying drawing, wherein Figure 1 is a vertical section of my apparatus, and Fig. 2 is a horizontal section of my apparatus through line II—II of Fig. 1.

The coffee beans are enclosed in the perforated container $b$. Surrounding the container $b$ is the outside wall or jacket $a$, an open space being left between the wall $a$ and the container $b$. Steam is admitted through pipe $c$ or through a plurality of such pipes and is discharged through $d$. After the beans have been opened by the steaming operation, an extraction medium for caffein is admitted through pipe $f$ and discharged through $g$. After the extraction, the solvent is driven off by steam as already indicated.

What I claim is:

1. In a process of removing caffein from coffee beans, which comprises opening the beans with steam, extracting the beans with an organic solvent, and expelling the residual extracting agent by means of steam in a confined zone, the step of having that portion of the steam that condenses in the zone substantially wholly condensed at a distance from the beans.

2. In a process of removing caffein from coffee beans, which comprises opening the beans with steam, extracting the beans with an organic solvent, and expelling the residual extracting agent by means of steam, the steps of subjecting the coffee beans to the action of steam in a confined zone defined by a surface maintained at a temperature below the condensation temperature of the steam and maintaining the beans out of contact with the condensing surface.

3. In a process of removing caffein from coffee beans, which comprises opening the beans with steam, extracting the beans with an organic solvent, and expelling the residual extracting agent by means of steam, the steps of subjecting the coffee beans to the action of steam in a confined zone, condensing steam in said zone out of contact with the coffee beans, and discharging the condensate to prevent contact of the condensate with the beans.

FRANS MARINUS MEIJER.